(No Model.) 2 Sheets—Sheet 1.

F. H. HEATH.
THRUST BEARING FOR SHAFTS.

No. 599,040. Patented Feb. 15, 1898.

Witnesses:
R. Schleicher.
S. S. Williamson.

Inventor
Frederick H. Heath
By Geo. H. Holgate
Attorney (No Model.)  2 Sheets—Sheet 2.
F. H. HEATH.
THRUST BEARING FOR SHAFTS.
No. 599,040.  Patented Feb. 15, 1898.
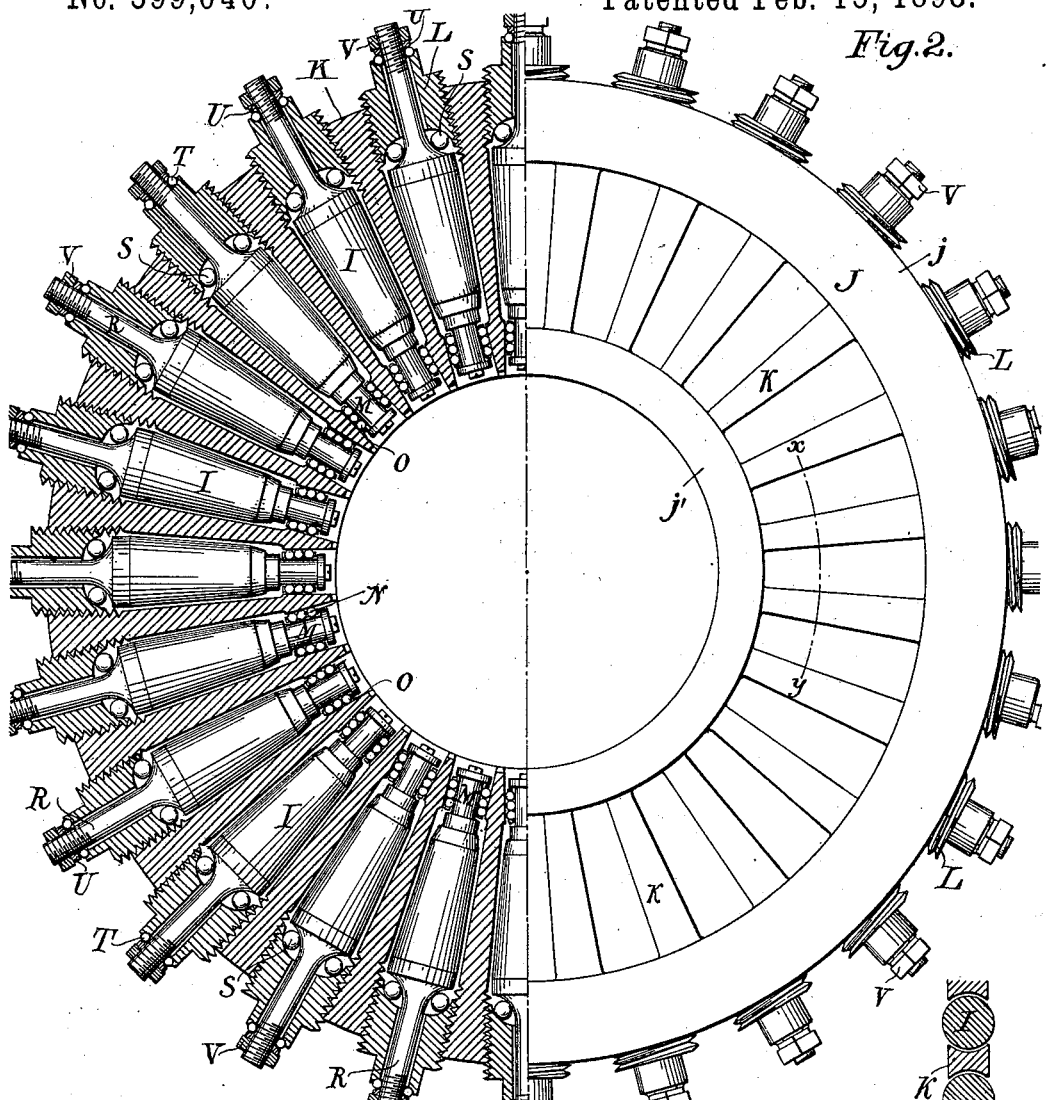
Fig. 2.
Fig. 5.
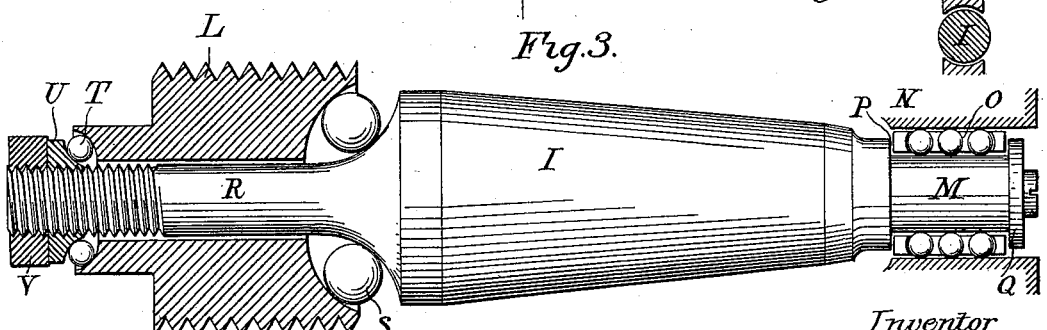
Fig. 3.
Witnesses:
R. Schleicher.
H. Williamson
Inventor
Frederick H. Heath
By Geo. H. Holgate
Attorney

UNITED STATES PATENT OFFICE.

FREDERICK H. HEATH, OF TACOMA, WASHINGTON.

THRUST-BEARING FOR SHAFTS.

SPECIFICATION forming part of Letters Patent No. 599,040, dated February 15, 1898.

Application filed March 9, 1897. Serial No. 626,611. (No model.)

*To all whom it may concern:*

Be it known that I, FREDERICK H. HEATH, a citizen of the United States, residing at Tacoma, in the county of Pierce and State of Washington, have invented a certain new and useful Improvement in Thrust-Bearings for Shafts, of which the following is a specification.

My invention relates to a new and useful improvement in thrust ball-bearings for shafts, and is especially adapted for the shafts of large vessels, and has for its object to greatly reduce the friction now incident to the turning of such a shaft and also to construct the bearings as to intervene a series of tapered rolls between the revolving and stationary thrust-blocks, while at the same time these rolls are provided with ball-bearings, which relieve them of all undue friction when in operation; and a further object of my invention is to permit the entire series of rolls to travel in a direction of rotation, thus preventing the device from cramping, and incidentally the object of my invention is to provide for the thrust of a shaft in either direction by providing a duplication of my improved device upon each side of the journal-block.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1:
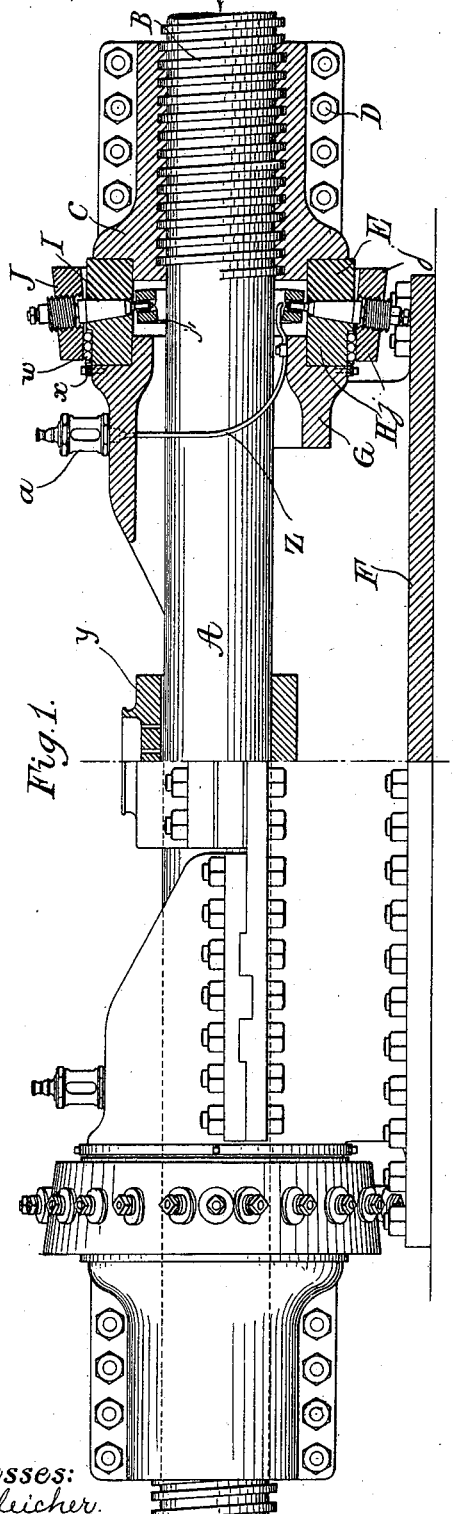
Figure 4:
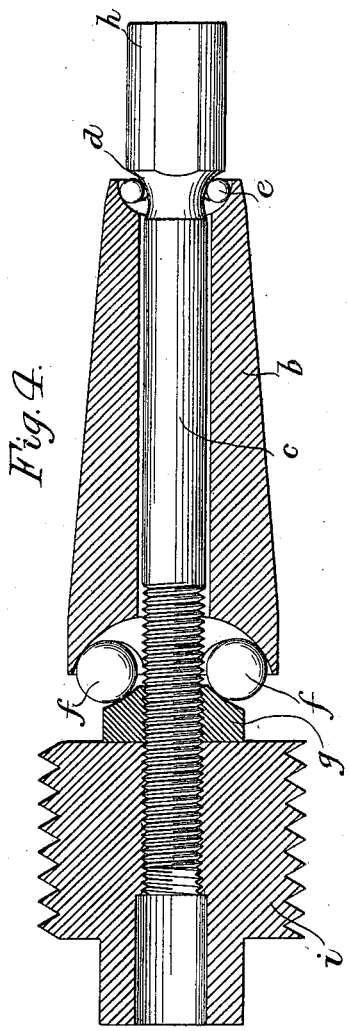

Figure 1 represents my improvement, half of the same being in elevation, while the other half is in section; Fig. 2, a sectional elevation of the roller-carriage; Fig. 3, an enlarged detail view of the preferred form of construction of one of the rollers, showing its ball-bearings; Fig. 4, a similar view of a modified form of roll; and Fig. 5, a section at the line $x y$ of Fig. 2, showing the rolls in the interdental space of the carriage.

In carrying out my invention as here embodied A represents a shaft, which may be a propeller-shaft, and this shaft has either formed thereon the screw-threads B or said threads may be formed upon a collar which is secured to the shaft, and upon these threads is run the sleeve C, or said sleeve may be made in two sections and secured together by the bolts D, in which case when the sleeve is properly adjusted these bolts will serve to tighten its sections upon the shaft in order that it may have no independent movement of said shaft. A thrust-ring E is fitted upon a shoulder formed upon the sleeve, and this ring is preferably of hardened steel in order that its bearing-surface may not become unduly worn when in use. The journal-block F has formed at each end thereof a circular housing G, and upon a shoulder thereof is secured the thrust-ring H, which is similar to the ring E, and between these two rings run the rollers I, as hereinafter set forth.

J represents the roller-carriage, which consists of an outer ring $j$ and an inner ring $j'$, which are connected together by ribs K, thus forming interdental spaces therebetween, and within these spaces are set the rolls I, having their inner ends journaled in suitable bearings in the inner ring, while their outer ends are journaled in plugs or bushings L for adjusting the position of the rolls, these plugs or bushings being threaded within the outer ring of the carriage J, as clearly shown in Figs. 1 and 2.

The inner bearing of each roller is provided with an extension M, around which are placed series of balls N, and these series are separated from each other by the guide-rings O, said rings and balls being confined between the shoulder P and the washer Q, while the outer bearing of each roll is provided with the shank R, formed thereon, the outer portion of which is threaded, and this shank passes through the plug or bushing L, which is run within a suitably-threaded opening in the outer ring of the roller-carriage. The plug or bushing L has a cup-shaped recess formed in its inner end, and within this recess are placed the balls S, which also bear against the fillet portion of the shank, and the outer end of the plug or bushing is also cup-shaped and has placed therein the balls T, against which is adjusted the cone-bearing U by being run upon the threaded end of the shank, and this cone-bearing, when properly adjusted, is secured in said adjustment by the nut V, which is jammed thereagainst. From this it will be seen that the roller-carriage is given its proper guidance by overlapping the thrust-ring H, and has interposed therebetween and said ring series of balls W, as clearly shown in Fig. 1, and these balls are confined in place by the ring X, secured around the housing G.

From the foregoing description it will be obvious that when the shaft is revolved, carrying the sleeve C therewith, the bearing of the thrust-ring E against the rollers will likewise cause said rollers to bear against the thrust-ring H should pressure be brought to bear upon the shaft in the direction of the arrow in Fig. 1. Now this would cause the rollers to revolve in their bearings and at the same time travel around the shaft upon the thrust-ring H, and this traveling of the rollers is permitted by the free revolving of the roller-carriage, the latter being saved from cramping by the balls W, as just described. This will relieve the shaft of an enormous amount of friction.

For propeller-shafts and the like, where they are liable to be subjected to end strain or thrust in either direction, it is preferable that my improved roller-and-ball bearing be placed at both ends of the journal-block, one of which is here shown in section, while the other is shown in elevation, and when this is done the shaft, if carrying a propeller, may revolve in either direction with no undue friction, and in order that such a shaft may be separated between the roller-and-ball bearings, so as to prevent vibration, a journal-box Y may be located midway between said bearings, which will steady the shaft.

The several contact-surfaces of my improvement may be lubricated by a pipe Z, leading from a suitable oil-cup $a$ to the interior of the roller-carriage, so that oil delivered at this point will first gain access to the balls N and gradually work outward by gravity and centrifugal force until reaching all of the frictional surfaces in the device.

In the case of large ocean-going vessels a number of these bearings may be placed along the propeller-shafts, so that should the vessel run aground and any of the bearings become strained or injured they may be thrown out of action, while the remaining bearings will permit the continued revolving of the shaft, and for war vessels this is of the greatest importance, since the result of a conflict may be turned one way or the other by the injury to the vessel's propelling mechanism.

While I prefer the form of roller above described, the form shown in Fig. 4 may be utilized for the same purpose, and the construction of this modification is a hollow roller $b$, through which passes a spindle $c$, which has a cone-bearing $d$ upon its inner end, against which the balls $e$ bear, said balls being placed within the concaved recess in the inner end of the roller. The outer end of the roller also has a concaved recess formed therein for the reception of the balls $f$, and these balls are confined by the cone-bearing $g$, run upon the threaded end of this spindle. The inner end of the spindle is enlarged, as indicated at $h$, and is adapted to fit within a suitable hole in the inner ring of the roller-carriage, while the outer end of this spindle is threaded within the bushing $i$, the latter in turn being threaded within the outer ring of the roller-carriage.

It is to be noted that the rollers I are set at an angle within the carriage, so that their outer surfaces stand at right angles to the shaft, thus adapting them to receive the strain occasioned by the thrust of the shaft, so as to prevent any unequal bearing on the rollers by an uneven rotation of the shaft, and in practice this will be found to be of considerable importance in the proper working of shafts of large size sustaining considerable end thrust.

Having thus fully described my invention, what I claim as new and useful is—

1. In combination with a thrust-bearing, a circular carriage, consisting of an inner ring and an outer ring and ribs for connecting said rings, a series of tapered rolls, each of said rolls having an extension M and a shank R, a series of balls arranged around the extension, a plug L threaded in the outer ring, a series of balls interposed between said plug and the shank of the roll, a cone-bearing U carried by the shank, and a series of balls interposed between said bearing and the outer end of the plug, substantially as and for the purpose set forth.

2. In combination with a roller-carriage for a thrust-bearing, consisting of an outer and an inner ring and ribs connecting said rings, a series of tapered rolls, extensions M formed with said rolls and passed within the openings in the inner ring, a series of balls surrounding said extension, a series of guide-rings O interposed between the balls, a washer Q for holding said rings and balls in place, shanks R extending outward from said rolls, a threaded plug through which said shank extends, said plug being run within threaded holes in the outer ring, a series of balls S interposed between the plug and shank, a cone-bearing U threaded upon the outer end of the shank, a series of balls T interposed between said bearing and the outer end of the plug, and a nut for holding the cone-bearing in place, as specified.

3. In a device of the character described, a circular carriage consisting of an outer and an inner ring connected together by ribs, rolls journaled in the carriage, plugs threaded in the carriage having holes through which the shanks of the rolls project, cones on the rolls, a series of balls between the cones and rolls, as and for the purpose described.

4. In a device of the character described, a shaft, a sleeve threaded thereon, said sleeve consisting of two sections bolted together, a journal-block, a thrust-ring secured thereon, a second thrust-ring carried by the sleeve, a roller-carriage journaled on the first-named thrust-ring, rolls journaled in said carriage adapted to travel between said thrust-rings, and means for adjusting the positions of the rolls, as and for the purpose described.

In testimony whereof I have hereunto affixed my signature in the presence of two subscribing witnesses.

FREDERICK H. HEATH.

Witnesses:
 F. MATTNER,
 H. K. MOORE.